United States Patent [19]

Stackman et al.

[11] Patent Number: 4,626,584
[45] Date of Patent: Dec. 2, 1986

[54] CROSSLINKABLE THERMOTROPIC POLYESTERS DERIVED FROM ALLYLICALLY SUBSTITUTED HYDROXYBENZOIC ACID AND A PROCESS FOR PREPARING A SHAPED ARTICLE OF THE POLYESTERS

[75] Inventors: Robert W. Stackman; Husam A. A. Rasoul, both of Racine, Wis.

[73] Assignee: Celanese Corporation, New York, N.Y.

[21] Appl. No.: 775,278

[22] Filed: Sep. 11, 1985

[51] Int. Cl.$^4$ .................... C08G 63/02; C08G 63/54
[52] U.S. Cl. .................................. 528/192; 528/173; 528/176; 528/190; 528/191; 528/193; 528/194; 528/271
[58] Field of Search ............... 528/173, 176, 190, 191, 528/192, 193, 194, 271

[56] References Cited

U.S. PATENT DOCUMENTS 4,118,372 10/1978 Schaefgen .......................... 528/192
4,230,817 10/1980 Charbonneau ...................... 528/192
4,355,136 10/1982 Dombroski et al. ................ 528/192
4,398,019 8/1983 Cox et al. .......................... 528/192

*Primary Examiner*—Lucille M. Phynes
*Attorney, Agent, or Firm*—Burns, Doane, Swecker & Mathis

[57] ABSTRACT

A novel polyester is provided which is capable of forming an anisotropic melt and which, subsequent to being formed into shaped articles, is capable of crosslinking to render the article highly heat stable. The polyester preferably consists of approximately 1 to 40 mole percent of 3-allyl-4-oxybenzoyl and/or 3-methylallyl-4-oxybenzoyl moieties copolymerized with oxyaroyl moieties and/or dioxaryl and dicarboxyaryl moieties. The process comprises heating a monomer mixture of allylically substituted hydroxybenzoic acid and aromatic hydroxy acids and/or aromatic diols and diacids to prepare the polyester; melt processing the polyester to form a solid shaped article; and heating to substantially crosslink the allylic groups while substantially retaining the configuration of the solid shaped article.

27 Claims, No Drawings

CROSSLINKABLE THERMOTROPIC POLYESTERS DERIVED FROM ALLYLICALLY SUBSTITUTED HYDROXYBENZOIC ACID AND A PROCESS FOR PREPARING A SHAPED ARTICLE OF THE POLYESTERS

BACKGROUND OF THE INVENTION

This invention relates to thermotropic crosslinkable polyesters capable of forming a anisotropic melt and having approximately 1 to 40 mole percent of units derived from allylically substituted hydroxybenzoic acid and to a process for preparing a shaped article of the polyesters.

It is known in the art to prepare polymers from ethylenically unsaturated hydroxybenzoate esters. U.S. Pat. No. 3,141,903 to Fertig et al discloses a monomer of the formula

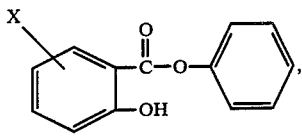

wherein X is an ethylenically unsaturated group selected from the group consisting of acrylyloxy, acrylyloxyalkyl, methacrylyloxy, and methacrylyloxyalkyl. However, these monomers are said to undergo vinylic type polymerization rather than polyesterification, and therefore no pendant allylic groups remain and the polymer which results is therefore not crosslinkable.

It is also known to produce polymers other than polyesters from allyl substituted phenols or phenolic derivatives. Canadian Patent No. 569,348 to D'Alelio discloses a polymerizable allyl phenyl monomer of the formula:

$$CH_2=CH-CH_2-Ar-O-X,$$

wherein Ar is an arylene radical and X may be epoxyalkyl, hydroxyalkyl, dihydroxyalkyl, chloroalkyl or $-CH_2COOH$. Polymers prepared from the monomer of D'Alelio are said to contain oxyalkylene rather than ester linkages, and pendant allylic groups.

Also, Japanese Pat. No. 0082719 discloses a polyphenylene ether having pendant allyl groups. The modification of the polymer is said to permit easy graft copolymerization, epoxidation, or halogenation. However, neither of these patents appears to disclose polymers which have polyester linkages and which are capable of forming an anisotropic melt which may be crosslinked.

It is also known to prepare aromatic copolyesters of hydroxynaphthoic acid and hydroxybenzoic acid. U.S. Pat. Nos. 4,337,190 and 4,161,470 to Calundann and U.S. Pat. No. 4,429,105 to Charbonneau (assigned to the assignee of the present application) disclose wholly aromatic copolyesters of the above acids which exhibit a thermotropic melt phase. However, the copolymers of the Calundann and Charbonneau patents contain no pendant allylic groups and are therefore not crosslinkable.

It is also known to produce wholly aromatic monomers having liquid crystalline central portions and crosslinkable end groups. For example, U.S. Pat. Nos. 4,440,945 and 4,452,993 to Conciatori et al disclose wholly aromatic monomers which are terminated with acetylene and acrylic acid, respectively, and which are capable of forming an anisotropic melt which may be crosslinked. However, inasmuch as these oligomers are of low molecular weight, they have low melting temperatures and are therefore unstable at high temperatures.

Accordingly, it is an object of the present invention to provide thermotropic crosslinkable polyesters containing recurring units derived from allylically substituted hydroxybenzoic acid.

It is a further object of the present invention to provide thermotropic crosslinkable polyesters containing recurring units derived from allylically substituted hydroxybenzoic acid which exhibit anisotropy in the melt phase and which may be formed into a shaped article and crosslinked to produce an article which is heat stable at temperatures in excess of the melting point of the uncrosslinked polyester article.

It is a still further object of the present invention to provide a thermotropic crosslinkable polyester containing recurring units derived from allylically substituted hydroxybenzoic acid copolymerized with hydroxybenzoic and/or hydroxynaphthoic acids free of allylic substitution and/or substantially stoichiometrically balanced amounts of aromatic diols and aromatic diacids.

It is a still further object of the invention to provide a process for preparing a crosslinked shaped polyester article from a polyester containing recurring units derived from allylically substituted hydroxybenzoic acid.

These and other objects, as well as the scope, nature and utilization of the invention, will be apparent from the following detailed description of the present invention and appended claims.

SUMMARY OF THE INVENTION

In accordance with one aspect, the present invention provides a thermotropic crosslinkable polyester capable of forming an anisotropic melt consisting essentially of (a) approximately 1 to 40 mole percent of the recurring moiety:

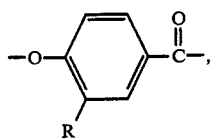

wherein R is an allylic group of the formula:

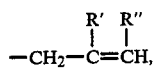

wherein R' and R" are independently selected from the group consisting of hydrogen, methyl, ethyl, propyl, phenyl, phenylmethyl, phenylethyl, and mixtures thereof, and (b) approximately 60 to 99 mole percent of recurring moieties selected from the group consisting of:

which are substantially free of allylic ring substitution, and substantially stoichiometrically balanced amounts of the recurring moieties

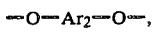

and

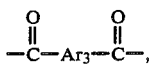

and mixtures thereof, wherein Ar$_1$, Ar$_2$ and Ar$_3$ are independently selected and each represent one or more divalent radicals comprising at least one aromatic ring.

In a further aspect, the present invention provides a process for preparing a crosslinked shaped polyester article. The process comprises (a) heating a monomer mixture consisting essentially of (i) approximately 1 to 40 mole percent of the monomer:

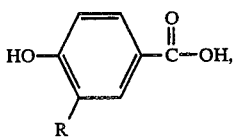

and/or the ester-forming derivatives thereof, wherein R is an allylic group of the formula:

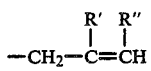

wherein R' and R" are independently selected from the group consisting of hydrogen, methyl, ethyl, propyl, phenyl, phenylmethyl, phenylethyl and mixtures thereof, and (ii) approximately 60 to 99 mole percent of monomers selected from the group consisting of:

and/or the ester-forming derivatives thereof, which monomer B is substantially free of allylic ring substitution, and substantially stoichiometrically balanced amounts of monomers of the formulae:

and

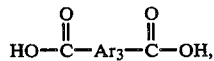

and/or the ester-forming derivatives thereof, and mixtures thereof, wherein Ar$_1$, Ar$_2$ and Ar$_3$ are independently selected and each represent one or more divalent radicals comprising at least one aromatic group, to a temperature sufficient to polyesterify the monomers to form a polyester;

(b) melt processing the resulting polyester to form a solid shaped article; and (c) heating the resulting solid shaped article of (b) to a temperature sufficient to substantially crosslink allylic groups derived from monomer A of the polyester while substantially retaining the configuration of the solid shaped article imparted in step (b).

DESCRIPTION OF PREFERRED EMBODIMENTS

As stated hereinabove, the present invention relates to a thermotropic crosslinkable polyester capable of forming an anisotropic melt and having approximately 1 to 40 mole percent of units of the formula:

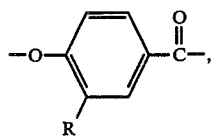

wherein R is an allylic group of the formula:

wherein R' and R" are independently selected from the group consisting of hydrogen, methyl, ethyl, propyl, phenyl, phenylmethyl, phenylethyl, or mixtures thereof, e.g., the units 3-allyl-4-oxybenzoyl or 3-methylallyl-4-oxybenzoyl, or mixtures thereof. These units may be derived from monomers of the formula:

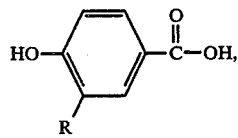

wherein R has the same significance as above, e.g., the monomers 3-allyl-4-hydroxybenzoic acid or 3-methylallyl-4-hydroxybenzoic acid, or mixtures of these. These hydroxyacid compounds may be prepared from the corresponding 4-carbomethoxy phenylallyl substituted ethers via a Claisen rearrangement reaction by techniques well known to one skilled in the art. In a preferred technique, 3-allyl-4-hydroxybenzoic acid may be prepared by heating the allyl ether to a temperature of approximately 200° to 250° C. under reflux conditions for approximately 0.5 to 2 hours. The product may be isolated by dissolving in a sodium hydroxide solution (e.g., a 20 percent by weight sodium hydroxide solution), and extracted with petroleum ether. The resulting aqueous alkaline solution may be acidified, extracted with ethylether, and the ether evaporated to obtain the allylically substituted hydroxylbenzoic acid product.

In a preferred embodiment, the polyester comprises moieties wherein R' is methyl or ethyl, inasmuch as the polymr comprising these moieties has a higher crosslinking temperature than the polymer comprising its nonsubstituted allyl analog (i.e., wherein R' is H). It is most desirable to employ monomers having a wide temperature differential between the temperature at which polyesterification occurs and the curing temperature (i.e., the temperature at which crosslinking of the unsaturated substituents occurs). When this differential is low, it is necessary to more carefully regulate polymerization conditions in order to prevent crosslinking of the allyl groups prior to melt processing into a fiber, film, or other shaped article. Optimally, the differential between the melt temperature and the curing temperature is at least approximately 15° C., and preferably at least approximately 20° C.

In addition to allylic substituents, the aromatic ring of the allylically substituted hydroxybenzoic acid may be substituted at any or all of the 2, 5, and 6 positions. Suitable substituents include alkyl groups of 1 to 4 carbon atoms, alkoxy groups of 1 to 4 carbon atoms, phenyl, halogen, and mixtures of the foregoing. Preferably a maximum of one of the 2, 5 and 6 positions are substituted, and most preferably none of these positions are substituted. Although the present invention does not require the use of ring-substituted allylic hydroxybenzoic acid, use of the same may facilitate melt polymerization and/or melt processing at a lower temperature than the unsubstituted monomer, facilitating processing and lessening the likelihood of crosslinking in the melt.

The polyesters of the present invention are copolymers of the aforedescribed allylically substituted hydroxybenzoic acids with aromatic hydroxy acids free of allyl and methylallyl ring substitution and/or aromatic diacids or diols.

The polyester comprises approximately 1 to 40 mole percent of allylically substituted units and preferably between approximately 1 and approximately 10 mole percent (e.g., approximately 5 mole percent). When the polyester comprises a higher percentage (i.e., 60% or more) of allylically substituted units, the amount of crosslinking is very high and the resulting polyester after crosslinking will be very brittle, and shaped articles prepared therefrom may show a significant decrease in mechanical properties (e.g., fiber tenacity).

The polyester containing allylically substituted oxybenzoyl moieties is a copolymer having approximately 60 to 99 mole percent, and preferably approximately 90 to 99 mole percent, of aromatic moieties free of allylic ring substitution. Suitable such moieties include oxyaroyl moieties, dioxyaryl moieties, and dicarboxyaryl moieties, which are derived from aromatic monomers such as hydroxy acids, diols and diacids, respectively.

Suitable oxyaroyl moieties are of the formula:

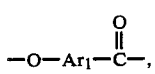  II.

wherein $Ar_1$ is a divalent radical comprising at least one aromatic ring and is free of allylic ring substitution. Suitable oxyaroyl units include 4-oxybenzoyl units, 6-oxy-2-naphthoyl units, and mixtures thereof, and their ring-substituted derivatives, wherein the aromatic rings optionally may include substituents including alkyl groups of 1 to 4 carbon atoms, alkoxy groups of 1 to 4 carbon atoms, phenyl, halogen, and mixtures of the foregoing. Examples of such ring substituted oxyaryl units include 6-oxy-5-chloro-2-naphthoyl, 6-oxy-5-methyl-2-naphthoyl, 6-oxy-5-methoxy-2-naphthoyl, 6-oxy-7-chloro-2-napthoyl, 6-oxy-4,7-dichloro-2-naphthoyl, etc. Preferred oxyaroyl units are 4-oxybenzoyl and 6-oxy-2-naphthoyl units. As will be apparent to one skilled in the art, these moieties can be readily derived from the corresponding hydroxy aromatic acids of the formula

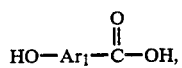  B.

wherein $Ar_1$ has the same significance as above, e.g., 4-hydroxybenzoic acid and 6-hydroxy-2-naphthoic acid.

Copolymerized with the allylically substituted hydroxybenzoic acid (i.e., monomer A) in the polyester of the present invention, alone or in combination with hydroxybenzoic acid free from aromatic substitution (i.e., monomer B), may be substantially stoichiometrically balanced amounts of aromatic diols and dicarboxylic acids which contribute moieties of the formulae:

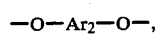  III.

and

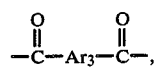  IV.

wherein $Ar_2$ and $Ar_3$ are independently selected and each represent one or more divalent radicals comprising at least one aromatic ring.

Suitable examples of dioxyaryl moiety III include:

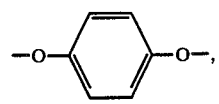

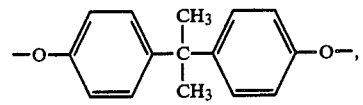

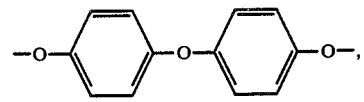

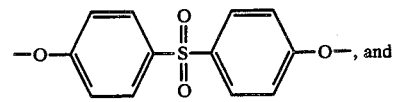, and

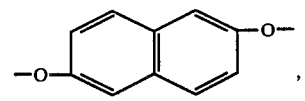

and mixture of the foregoing.

The preferred moiety III is:

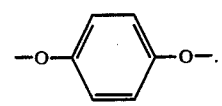.

Suitable examples of dicarboxyaryl moiety IV include:

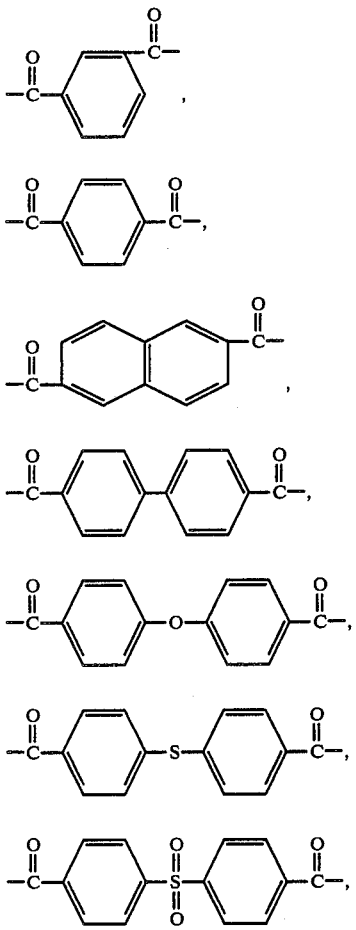

and mixtures of the foregoing. The preferred dicarboxyl moieties IV are:

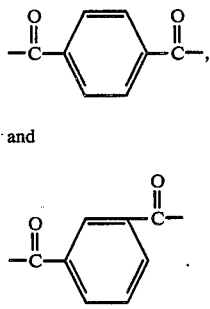

and

Each of moieties III and IV may or may not contain substituents on the aromatic ring(s). Where ring substitution occurs, suitable substituents include alkyl groups of 1 to 4 carbon atoms, alkoxy groups of 1 to 4 carbon atoms, phenyl, halogen, and mixtures thereof.

The polymer may also contain small amounts of non-aromatic moieties, but these moieties should be limited to those amounts (i.e., approximately 0 to 10%) which do not seriously affect the advantageous characteristics of the polyester. Such moieties include ethylene glycol. As will be apparent to one skilled in the art of polymer technology, moieties III and IV may readily be derived from the corresponding diols and diacids, i.e., monomers having the formulae:

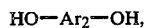  C.

and

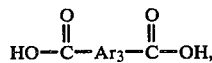  D.

or the ester-forming derivatives thereof wherein $Ar_2$ and $Ar_3$ have the same significance as above. Illustrative of the aromatic comonomers from which these units may be derived are bisphenol A, 6-hydroxy-2-naphthoic acid, 2,6-naphthalene dicarboxylic acid, terephthalic acid, isophthalic acid, hydroquinone, ring substituted hydroquinone (e.g., methylhydroquinone), 2,6-naphthalene diol and mixtures thereof. As is well known in the art, when the polyester is to contain moieties III and IV, it is preferable to substantially stoichiometrically balance the amounts of diols and diacids to ensure a complete reaction of the monomers.

Preferred comonomers to be copolymerized with allylically substituted hydroxybenzoic acid include 4- or 3-hydroxybenzoic acid, 6-hydroxy-2-naphthoic acid, terephthalic acid, and hydroquinone. The most preferred comonomers are 4-hydroxybenzoic acid and 6-hydroxy-2-naphthoic acid.

In a preferred embodiment, approximately 1 to 10 mole percent of allylically substituted oxybenzoyl (i.e., moiety I) moieties are present in the polyester, the remaining approximately 90 to 99 mole percent being oxyaroyl (i.e., moiety II) moieties free of allylic substitution, e.g., oxybenzoyl and/or oxynaphthoyl moieties.

In another preferred embodiment, approximately 1 to 10 mole percent of allylically substituted oxybenzoyl (i.e. moiety I) moieties and approximately 45 to 49.5 mole percent each of aromatic dioxyaryl and dicarboxyaryl (i.e., moieties III and IV) moieties are present in the polyester.

In another preferred embodiment, the polyester consists essentially of approximately 1 to 10 mole percent of 3-allyl-4-oxybenzoyl moieties, approximately 20 to 70 mole percent of 4-oxybenzoyl moieties, and approximately 20 to 70 mole percent of 6-oxy-2-naphthoyl moieties. In a most preferred embodiment, the polyester consists essentially of approximately 5 mole percent of 3-allyl-4-oxybenzoyl moieties, approximately 45 mole percent of 4-oxybenzoyl moieties, and approximately 50 mole percent of 6-oxy-2-naphthoyl moieties.

In another preferred embodiment, the polyester consists essentially of approximately 1 to 10 mole percent of 3-methylallyl-4-oxybenzoyl moieties, approximately 20 to 70 mole percent of 4-oxybenzoyl moieties, and approximately 20 to 70 mole percent of 6-oxy-2-naphthoyl moieties. In another most preferred embodiment, the polyester consists essentially of approximately 5 mole percent of 3-methylallyl-4-oxybenzoyl moieties, approximately 45 mole percent of 4-oxybenzoyl moieties, and approximately 50 mole percent of 6-oxy-2-naphthoyl moieties.

The polyesters of the present invention may be formed by a variety of ester-forming techniques whereby the monomers possessing functional groups which upon condensation form the requisite recurring moieties are reacted. For instance, the functional groups of the monomers may be carboxylic acid groups, hydroxyl groups, ester groups, acyloxy groups, acid halides, etc. The monomers may be reacted in the absence of a heat exchange fluid via a melt acidolysis procedure, or by a slurry polymerization process. Accordingly, the monomers may be heated initially to form a melt solution of the reactants with the reaction continuing as solid polymer particles are suspended therein. A vacuum may be applied to facilitate removal of volatiles formed during the final stage of the condensation (e.g., acetic acid or water).

When employing either the melt acidolysis procedure or the slurry procedure the monomer reactants from which moieties A through D are derived may be initially provided in a modified form whereby the usual hydroxyl and/or carboxyl groups of these monomers are esterified (e.g., the usual hydroxyl groups may be provided as acyl esters). For instance, lower acyl esters of 3-allyl-4-hydroxybenzoic acid, 3-methylallyl-4-hydroxybenzoic acid, 6-hydroxy-2-naphthoic acid and p-hydroxybenzoic acid, wherein the hydroxy groups are esterified, may be provided as reactants. Such lower acyl groups preferably have from about 2 to about 4 carbon atoms. Preferably employed are the acetate esters of the monomers. Accordingly, particularly preferred reactants for the condensation reaction are 3-allyl-4-acetoxybenzoic acid, 3-methylallyl-4-acetoxybenzoic acid, 6-acetoxy-2-naphthoic acid and p-acetoxybenzoic acid. If other aromatic diols (as previously discussed) provide oxy- units within the resulting polymer, these too preferably are provided as the corresponding lower acyl esters. Likewise, any monomers which provide carboxy groups may be provided in a modified form whereby the carboxy groups are esterified, for instance, by first reacting with an aromatic monohydroxy compound such as phenol, m-cresol, p-cresol, etc., as described, for example, in U.S. Pat. No. 4,333,907.

Preparation of the polyester is preferably carried out in the melt, i.e. by heating a monomer mixture as discussed above. Melt polymerization may be achieved by first placing the required molar amounts of the esterified (e.g., acetylated) monomers in a reaction vessel equipped with a mechanical agitator, a gas inlet and a distillation head. Since the presence of oxygen tends to inhibit polymerization, the reaction mixture is typically blanketed with an inert gas, such as nitrogen or argon to render the atmosphere non-oxidizing, at approximately atmospheric pressure. The reaction vessel is then heated for approximately 2 to 5 hours at a temperature sufficient to polyesterify the monomers, i.e., a temperature ranging from approximately 240° C. to 270° C., preferably from approximately 250° C. to 260° C. At the end of this time, the vessel gradually is evacuated over a period of from approximately 10 to 30 minutes to a pressure of from approximately atmospheric to 0.1 mm. Hg to remove acetic acid from the vessel. In a preferred embodiment, it is desirable to maintain the temperature within a fairly constant range (i.e., 250° C. to 260° C.) throughout the polyesterification reaction.

Representative catalysts which optionally may be employed in either the melt hydrolysis procedure or in the slurry procedure include dialkyl tin oxide (e.g., dibutyl tin oxide), diaryl tin oxide, titanium dioxide, alkoxy titanium silicates, titanium alkoxides, alkali and alkaline earth metal salts of carboxylic acids, the gaseous acid catalysts such as Lewis acids (e.g., $BF_3$), hydrogen halides (e.g., HCl) etc. The quantity of catalyst utilized typically is approximately 0.001 to 1 percent by weight based upon the total monomer weight, and most commonly approximately 0.01 to 0.2 percent by weight.

The molecular weight of the previously formed polyester may be further increased via a solid state polymerization procedure wherein the particulate polymer is heated in an inert atmosphere (e.g., in a nitrogen atmosphere at a temperature of approximately 250° C.) for 5 to 10 hours.

The polymerization process may be operated on a continuous, semi-continuous or, preferably, on a batch basis.

An alternate process for preparing copolyesters that include allylically substituted oxybenzoyl units is disclosed in U.S. Pat. No. 4,067,852, the content of which is incorporated by reference. As is more fully described in the patent, the slurry polymerization technique involves the use of a liquid heat exchange medium which acts as a solvent for at least one of the reactants. The temperature of the mixture is increased and the polymer forms as a fine insoluble solid in the medium. Following cooling of the mixture, recovery of the polymer is accomplished by conventional steps such as decantation, centrifugation or filtration. The separated polymer may then be washed and dried.

The prepared polyester is capable of forming an anisotropic melt (i.e., forms liquid crystals). Anisotropy can be confirmed by standard polarized light techniques whereby crosspolarizers are employed. Although the amount of light transmitted generally increases when a sample is sheared (e.g., by laterally moving the cover slide of a hot stage microscope), the melt is optically anisotropic even in the static state.

Wide variations in melting temperature may occur depending on the type and amount of other constituents in the polyester. However, the melting temperature generally ranges from approximately 240° C. to 280° C. (as determined by differential scanning calorimetry, or DSC). As discussed above, it is desirable to form a polyester having a relatively low melting temperature, i.e., between approximately 260° and 280° C.

The polyester of the present invention commonly exhibits a weight average molecular weight of approximately 2,000 to 200,000, and preferably approximately 10,000 to 50,000. Such molecular weight may be determined by standard techniques.

The polyester prior to shaping and crosslinking commonly exhibits an inherent viscosity (I.V.) of at least approximately 0.5 dl./g, and preferably at least approximately 1.0 dl./g, when dissolved in a concentration of 0.1 percent by weight in pentafluorophenol at 60° C. The inherent viscosity will vary depending on the constituents and the degree of polymerization obtained.

Following polymerization and prior to crosslinking, the polyester of the present invention may be melt processed to form shaped articles having the desired configuration.

To form fibers, films or other solid three dimensional shaped articles, the polyester of the present invention is typically melt processed by conventional techniques such as melt spinning, pressure molding, extrusion, etc. In melt processing the polyester, care must usually be taken to avoid thermal degradation of the polymer. That is, it is usually desirable to obtain a stable melt phase. This generally involves a selection of the components forming the polyester and a regulation of the process temperature and pressure. During shaping, it is essential that the temperature of the polyester not exceed its curing temperature, and that the duration of heating is sufficiently short to prevent crosslinking.

When forming fibers and films, the extrusion orifice may be selected from among those commonly utilized during the melt extrusion of such shaped articles. For instance, the shaped extrusion orifice may be in the form of a rectangular slit (i.e., a slit die) when forming a polymeric film. When forming a filamentary material the spinneret selected may contain one and preferably a plurality of extrusion orifices. For instance, a standard conical spinneret containing 1 to 2000 holes (e.g., 6 to 1500 holes) such as commonly used in the melt spinning of polyethylene terephthalate, having a diameter of approximately 1 to 60 mils (e.g., 5 to 40 mils) may be utilized. Yarns of about 20 to 200 continuous filaments are commonly formed. The melt-spinnable polyester of the present invention is supplied to the extrusion orifice at a temperature above its melting point but well below its crosslinking temperature e.g., a temperature of approximately 250° to 295° C., and preferably 260° to 270° C., depending on the melting point and crosslinking temperature of the polyester.

Subsequent to extrusion through the shaped orifice, the resulting filamentary material or film is passed in the direction of its length through a solidification or quench zone wherein the molten filamentary material or film is transformed to a solid filamentary material or film. The resulting as-spun filaments commonly have a denier per filament of approximately 1 to 50, and preferably a denier per filament of approximately 1 to 20, and most preferably approximately 5 to 10.

When molded articles are to be prepared, the polyester of the present invention may incorporate approximately 1 to 60 percent by weight of a solid filler (e.g., talc) and/or reinforcing agent (e.g., glass fibers).

In accordance with the present invention, the polyester, which is originally thermoplastic in nature, is post-treated after the solid shaped articles is formed to crosslink the polymer chains through the reactive double bond in the allylic group, thus rendering the polymer in a sense thermosetting. This may be accomplished by heating ultraviolet radiation or chemical copolymerization. Preferably, crosslinking is performed by heating the solid shaped article formed above to a temperature in the range of approximately 275° to 310° C., and preferably approximately 290° to 300° C., depending on the specific monomer employed. As discussed above, it is desirable to employ monomers which crosslink at a temperature substantially above their melting temperature in order to prevent premature crosslinking.

When the crosslinking step commences, the shaped article to be crosslinked is first heated to a temperature of approximately 240° to 260° C., and preferably approximately 240° to 250° C., i.e., approximately 10° to 15° C. below the melting point of the uncrosslinked polyester, such that the article is retained in its solid state. By gradually increasing the temperature of the shaped article (i.e., by 10° increments over 5 to 10 hours to an eventual temperature in the range of approximately 275° to 310° C. and preferably approximately 290° to 300° C.), the melting temperature of the polyester gradually increases as the polyester undergoes chain extension reaction and/or transesterification and the article substantially retains the configuration imparted in the shaping step.

Optionally, the crosslinking step may be performed in an oven under an inert atmosphere in order to prevent termination of the crosslinking process, with individual fibers being mounted on a rack to prevent shrinkage.

After the crosslinking reaction is completed, substantially all (i.e., above 1 to 40 percent and preferably above approximately 4 percent) of the allylically substituted units will be crosslinked while retaining the configuration of the shaped article. The resulting crosslinked shaped polyester article preferably is heat stable up to approximately 450° C. and most preferably to approximately 500° C.

The following Examples are given as specific illustrations of the polyester and process of the present invention. It should be understood, however, that the invention is not limited to the specific details set forth in the Examples.

EXAMPLE I

To a three-neck, 30 ml. round flask equipped with a stirrer, argon inlet tube, and distillation head connected to a condenser are added:

(a) 4.2 grams 3-allyl-4-acetoxybenzoic acid (0.02 mole),
(b) 32.4 grams 4-acetoxybenzoic acid (0.18 mole),
(c) 46.0 grams 6-acetoxy-2-naphthoic acid (0.2 mole), and
(d) 0.01 grams of potassium acetate catalyst.

The charged flask is vacuum purged with argon three times and gradually (i.e., over one hour) brought to a temperature of 250° C. As polymerization begins to occur, the solution is stirred rapidly under a stream of dry argon while acetic acid is distilled from the vessel. The reaction melt begins to turn opaque with suspended polymer after approximately 20 minutes. The polymerization mixture is stirred for one hour at 250° C., and then for an additional hour at 260° C. Approximately 18 ml. of acetic acid are collected. The polymerization temperature is next increased to 270° C., at which temperature the polymer is held for 60 minutes under an argon flow and then subjected to a reduction in pressure. The argon flow is then halted and the pressure above the polymer melt is reduced to and held at 0.5 mm. Hg for approximately 15 minutes. During this stage the polymer melt continues to increase in viscosity and is stirred more slowly while the remaining acetic acid is removed from the reaction vessel. Upon cooling (i.e., to approximately 25° C.), the resulting polymer plug is finely ground and dried in a forced air oven at 80° C. for approximately 3 hours.

The resulting polyester has an inherent viscosity (I.V.) of 1.5 as determined in a pentafluorophenol solution of 0.1 percent by weight concentration at 60° C. where:

$$I.V. = \ln (\eta rel)/c,$$

where c=concentration of solution (0.1 percent by weight), and $\eta rel$=relative viscosity. The relative viscosity is measured by dividing flow time in a capillary viscometer of the polymer solution by the flow time for the pure solvent.

When the polyester is subjected to differential scanning calorimetry (DSC), it exhibits a sharp melt endotherm at approximately 240° C. (peak). The polymer melt is anisotropic.

The polyester next is melt-extruded into a continuous filament of about 15 denier per filament. More specifically, the polyester polymer melt while at a temperature of approximately 239° C. is extruded through a spinneret provided with a single hole jet having a diameter of 20 mils and a length of 100 mils. The extruded filament is quenched in ambient air (i.e., at 72° F. and 65 percent relative humidity). The as-spun filament is taken up at a rate of 150 meters per minute.

Following extrusion, the polyester filament is subjected to further heating in order to crosslink pendant allyl groups. Crosslinking (curing) is achieved while mounting the filament on a rack to prevent shrinkage. The filament is subjected to a gradual increase in temperature, i.e., over 40 hours time, while maintaining the filament in the solid state. Specifically, the filament is first heated in an inert (nitrogen) atmosphere to approximately 230° C. (i.e., about 10° C. below its melting temperature) for 10 hours, and the temperature gradually increased in 5° C. increments over a total of 30 hours. After 40 hours, crosslinking is substantially (i.e., 90 percent) completed and the resulting shaped article is heat stable to approximately 450° C.

EXAMPLE II

Example I is substantially repeated with the exception that the following ingredients are charged to the flask:

(a) 2.4 grams 3-methylallyl-4-acetoxybenzoic acid (0.02 mole),
(b) 32.4 grams 4-acetoxybenzoic acid (0.18 mole),
(c) 46.0 grams 6-acetoxy-2-naphthoic acid (0.2 mole), and
(d) 0.01 grams of potassium acetate catalyst.

The resulting polyester prior to extrusion has an I.V. of 3.8 as determined in pentafluorophenol as previously described. The polyester melt is anisotropic and exhibits a sharp melt endotherm at approximately 262° C. (peak) when subjected to differential scanning calorimetry (DSC). Following extrusion, crosslinking occurs over a period of 40 hours at a temperature range of 262° to 310° C. The resulting fibers are heat stable to approximately 450° C.

Although the invention has been described with preferred embodiments, it is to be understood that variations and modifications may be employed without departing from the concept of the invention as defined in the claims which follow.

We claim:

1. A thermotropic crosslinkable polyester capable of forming an anisotropic melt consisting essentially of
   (a) approximately 1 to 40 mole percent of the recurring moiety

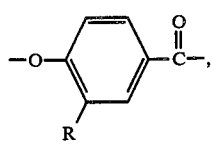  I.

wherein R is an allylic group of the formula

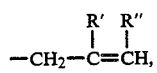

wherein R' and R" are independently selected from the group consisting of hydrogen, methyl, ethyl, propyl, phenyl, phenylmethyl, phenylethyl and mixtures thereof, and (b) approximately 60 to 99 mole percent of recurring moieties selected from the group consisting of

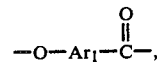  II.

are substantially free of allylic ring substitution, and substantially stoichiometrically balanced amounts of the recurring moieties

  III.

and

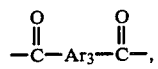  IV.

and mixtures thereof, wherein $Ar_1$, $Ar_2$ and $Ar_3$ are independently selected and each represent one or more divalent radicals comprising at least one aromatic ring.

2. A thermotropic crosslinkable polyester according to claim 1 wherein R of moiety I is allyl.

3. A thermotropic crosslinkable polyester according to claim 1 wherein R of moiety I is methylallyl.

4. A thermotropic crosslinkable polyester according to claim 1 wherein moiety II is selected from the group consisting of 4-oxybenzoyl moieties, 6-oxy-2-naphthoyl moieties, and mixtures thereof, and wherein the aromatic rings optionally may include substituents selected from the group consisting of an alkyl group of 1 to 4 carbon atoms, an alkoxy group of 1 to 4 carbon atoms, phenyl, halogen, and mixtures of the foregoing.

5. A thermotropic crosslinkable polyester according to claim 1 wherein moiety III is selected from the group consisting of:

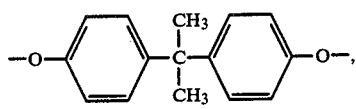

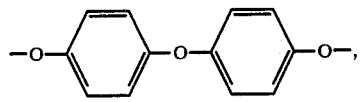

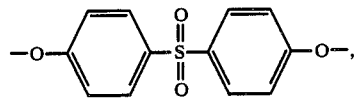

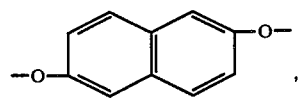

and mixtures of the foregoing.

6. A thermotropic crosslinkable polyester according to claim 1 wherein moiety III is:

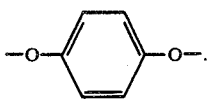

7. A thermotropic crosslinkable polyester according to claim 1 wherein moiety IV is selected from the group consisting of:

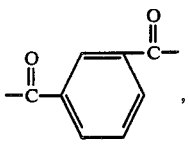

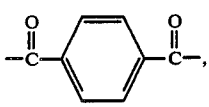

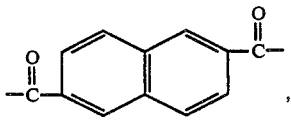

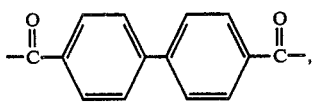

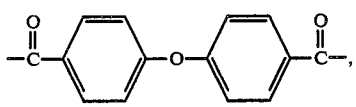

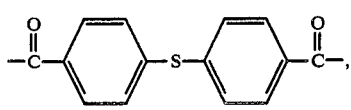

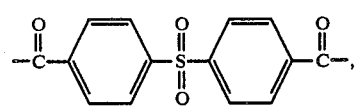

and mixtures of the foregoing.

8. A thermotropic crosslinkable polyester according to claim 1 wherein moiety IV is:

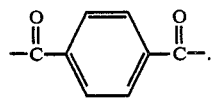

9. A thermotropic crosslinkable polyester according to claim 1 wherein moiety IV is:

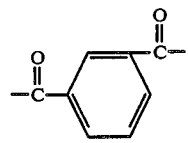

10. A thermotropic crosslinkable polyester according to claim 1 wherein moiety I is present in a concentration of approximately 1 to 10 mole percent.

11. A thermotropic crosslinkable polyester according to claim 1 wherein moiety I is present in a concentration of approximately 1 to 10 mole percent, and moiety II is present in a concentration of approximately 90 to 99 mole percent.

12. A thermotropic crosslinkable polyester according to claim 1 wherein moiety I is present in a concentration of approximately 1 to 10 mole percent, and moieties III and IV are each present in a concentration of approximately 45 to 49.5 mole percent.

13. A thermotropic crosslinkable polyester according to claim 1 which consists essentially of approximately 1 to 10 mole percent of 3-allyl-4-oxybenzoyl moieties, approximately 20 to 70 mole percent of 4-oxybenzoyl moieties, and approximately 20 to 70 mole percent of 6-oxy-2-naphthoyl moieties.

14. A thermotropic crosslinkable polyester according to claim 1 which consists essentially of approximately 1 to 10 mole percent of 3-methylallyl-4-oxybenzoyl moieties, approximately 20 to 70 mole percent of 4-oxybenzoyl moieties, and approximately 20 to 70 mole percent of 6-oxy-2-naphthoyl moieties.

15. A thermotropic crosslinkable polyester according to claim 1 which consists essentially of approximately 5 mole percent of 3-allyl-4-oxybenzoyl moieties, approximately 45 mole percent of 4-oxybenzoyl moieties, and approximately 50 mole percent of 6-oxy-2-naphthoyl moieties.

16. A thermotropic cross linkable polyester according to claim 1 which consists essentially of approximately 5 mole percent of 3-methylallyl-4-oxybenzoyl moieties, approximately 45 mole percent of 4-oxybenzoyl moieties, and approximately 50 mole percent of 6-oxy-2-naphthoyl moieties.

17. A crosslinked shaped article formed by heating the thermotropic crosslinkable polyester of claim 1 while in the solid state following melt processing under conditions sufficient to achieve substantial crosslinking.

18. A process for preparing a crosslinked shaped polyester article comprising:
(a) heating a monomer mixture consisting essentially of
(i) approximately 1 to 40 mole percent of the monomer:

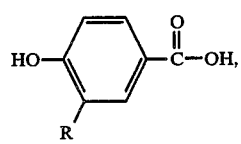

A.

and/or the ester-forming derivatives thereof, wherein R is an allylic group of the formula:

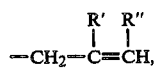

wherein R' and R" are independently selected from the group consisting of hydrogen, methyl, ethyl, propyl, phenyl, phenylmethyl, phenylethyl, and mixtures thereof, and
(ii) approximately 60 to 99 mole percent of monomers selected from the group consisting of:

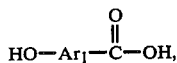

and/or the ester-forming derivatives thereof, which monomer B is substantially free of allylic ring substitution, and substantially stoichiometrically balanced amounts of monomers of the formulae

and

and/or the ester-forming derivatives thereof, and mixtures thereof, wherein $Ar_1$, $Ar_2$ and $Ar_3$ are independently selected and each represent one or more divalent radicals comprising at least one aromatic group, to a temperature sufficient to polyesterify said monomers to form a polyester;

(b) melt processing the resulting polyester to form a solid shaped article; and (c) heating the resulting solid shaped article of (b) at a temperature sufficient to substantially crosslink allylic groups derived from monomer A of the polyester while substantially retaining the configuration of the solid shaped article imparted in step (b).

19. A process for preparing a crosslinked shaped polyester article according to claim 18 wherein R of monomer A is allyl.

20. A process for preparing a crosslinked shaped polyester article according to claim 18 wherein R of monomer A is methylallyl.

21. A process for preparing a crosslinked shaped polyester article according to claim 18 wherein, in said polyesterification step (a), monomer A is present in a concentration of approximately 1 to 10 mole percent.

22. A process for preparing a crosslinked shaped polyester article according to claim 18 wherein, in said polyesterification step (a), monomer A is present in a concentration of approximately 1 to 10 mole percent, and monomer B is present in a concentration of approximately 90 to 99 mole percent.

23. A process for preparing a crosslinked shaped polyester article according to claim 18 wherein, in said polyesterification step (a), monomer A is present in a concentration of approximately 1 to 10 mole percent, and monomers C and D are each present in a concentration of approximately 45 to 49.5 mole percent.

24. A process for preparing a crosslinked shaped polyester article according to claim 18 wherein said polyesterification step (a) is performed for a period of time sufficient to obtain a polyester having an intrinsic viscosity prior to said crosslinking step (c) of greater than 0.5 dl./g. when dissolved in a concentration of 0.1 percent by weight in pentafluorophenol at 60° C.

25. A process for preparing a crosslinked shaped polyester article according to claim 18 wherein said polyesterification step (a) is performed in a non-oxidizing atmosphere.

26. A process for preparing a crosslinked shaped polyester article according to claim 18 wherein said polyesterification step (a) is performed at a temperature in the range of approximately 240° to 270° C. and said crosslinking step (c) is performed at a temperature in the range of approximately 250° to 295° C.

27. A process for preparing a crosslinked shaped polyester article according to claim 18 wherein said polyesterification step (a) is carried out in the melt.

* * * * *